(12) United States Patent
Wang et al.

(10) Patent No.: US 10,921,542 B2
(45) Date of Patent: *Feb. 16, 2021

(54) OPTICAL CABLE WIRING SYSTEM AND OPTICAL CABLE CONNECTING COMPONENT

(71) Applicant: COMMSCOPE TELECOMMUNICATIONS (SHANGHAI) CO. LTD., Shanghai (CN)

(72) Inventors: Zhengbin Wang, Shanghai (CN); Zhaohui Cai, Shanghai (CN); Yan Liu, Shanghai (CN); Dong Xu, Shanghai (CN)

(73) Assignee: CommScope Telecommunications (Shanghai) Co. Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/582,574

(22) Filed: Sep. 25, 2019

(65) Prior Publication Data

US 2020/0088968 A1 Mar. 19, 2020

Related U.S. Application Data

(63) Continuation of application No. 15/528,391, filed as application No. PCT/CN2015/095146 on Nov. 20, 2015, now Pat. No. 10,444,462.

(30) Foreign Application Priority Data

Nov. 21, 2014 (CN) .......................... 201410673296.3

(51) Int. Cl.
*G02B 6/46* (2006.01)
*G02B 6/38* (2006.01)
*G02B 6/44* (2006.01)

(52) U.S. Cl.
CPC ................. *G02B 6/46* (2013.01); *G02B 6/38* (2013.01); *G02B 6/44* (2013.01); *G02B 6/4446* (2013.01);
(Continued)

(58) Field of Classification Search
None
See application file for complete search history.

(56) References Cited

U.S. PATENT DOCUMENTS 5,125,060 A 6/1992 Edmundson
5,738,534 A 4/1998 Ingles et al.
(Continued)

FOREIGN PATENT DOCUMENTS

CN 1548998 A 11/2004
CN 1615448 A 5/2005
(Continued)

OTHER PUBLICATIONS

International Search Report and Written Opinion of the International Searching Authority for corresponding International Patent Application No. PCT/CN2015/095146 dated Feb. 24, 2016, 10 pgs.

(Continued)

*Primary Examiner* — Tina M Wong
(74) *Attorney, Agent, or Firm* — Merchant & Gould P.C.

(57) ABSTRACT

This invention discloses a type of optical cable wiring system, including: a main optical cable, first optical cable connector box and optical cable fan-out disposed near a first user zone; a second optical cable connector box disposed at a distance from the first user zone and near a second user zone; and a single main adapter optical cable disposed between the first optical cable connector box and second optical cable connector box. An optical cable fan-out converts a single main adapter optical cable to multiple branch adapter optical cables. Multiple branch adapter optical (Continued)

cables are connected to the main optical cable via a first optical cable connector box; multiple first distribution optical cables for the purpose of connection to a first user zone are connected to a main optical cable via a first optical cable connector box; multiple first distribution optical cables for the purpose of connection to a second user zone are connected to a single main adapter optical cable via a second optical cable connector box. In this manner, it becomes unnecessary to lay multiple second distribution optical cables over long distances between the first user zone and second user zone, thus reducing the laying length of second distribution optical cables, reducing material and labour costs, and additionally improving municipal aesthetics.

16 Claims, 4 Drawing Sheets

(52) U.S. Cl.
CPC ......... *G02B 6/4472* (2013.01); *G02B 6/4476* (2013.01); *G02B 6/4477* (2013.01)

(56) References Cited

U.S. PATENT DOCUMENTS

| | | | |
|---|---|---|---|
| 5,943,047 A | 8/1999 | Suzuki | |
| 5,966,489 A | 10/1999 | Harwell et al. | |
| RE36,592 E | 2/2000 | Giebel | |
| 6,104,855 A | 8/2000 | Jeon | |
| 6,135,398 A | 10/2000 | Quesnel | |
| 6,453,107 B1 | 9/2002 | Daoud | |
| 6,535,681 B2 | 3/2003 | Daoud et al. | |
| 6,623,173 B1 | 9/2003 | Grois et al. | |
| 6,738,555 B1 | 5/2004 | Cooke et al. | |
| 6,856,748 B1 | 2/2005 | Elkins, II et al. | |
| 7,218,827 B2 | 5/2007 | Vongseng et al. | |
| 7,277,614 B2 | 10/2007 | Cody et al. | |
| 7,277,620 B2 | 10/2007 | Vongseng et al. | |
| 7,349,616 B1 | 3/2008 | Castonguay et al. | |
| 7,428,366 B2 | 9/2008 | Mullaney et al. | |
| 7,494,284 B2 | 2/2009 | Robinson et al. | |
| 7,515,805 B2 | 4/2009 | Vongseng et al. | |
| 7,519,259 B2 | 4/2009 | Vongseng et al. | |
| 7,686,519 B2 | 3/2010 | Lu | |
| 7,809,233 B2 | 10/2010 | Smith et al. | |
| 7,809,234 B2 | 10/2010 | Smith et al. | |
| 7,826,706 B2 | 11/2010 | Vongseng et al. | |
| 8,184,940 B2 | 5/2012 | Smith et al. | |
| 8,254,740 B2 | 8/2012 | Smith et al. | |
| 8,417,083 B2 | 4/2013 | Dofher | |
| 8,538,228 B2 | 9/2013 | Smith et al. | |
| 8,705,930 B2 | 4/2014 | Lu et al. | |
| 8,774,585 B2 | 7/2014 | Kowalczyk et al. | |
| 8,818,158 B2 | 8/2014 | Smith et al. | |
| 8,837,930 B2 | 9/2014 | Shirakawa | |
| 8,837,940 B2 | 9/2014 | Smith et al. | |
| 8,938,143 B2 | 1/2015 | Do et al. | |
| 9,042,732 B2 | 5/2015 | Cune et al. | |
| 9,201,206 B2 | 12/2015 | Smith et al. | |
| 9,277,925 B2 | 3/2016 | Scianamblo | |
| 9,341,798 B2 | 5/2016 | Smith et al. | |
| 9,383,521 B2 | 7/2016 | Dendas et al. | |
| 9,395,509 B2 | 7/2016 | Petersen et al. | |
| 9,696,512 B2 | 7/2017 | Miller | |
| 9,891,397 B2 | 2/2018 | Hurley et al. | |
| 10,444,462 B2 * | 10/2019 | Wang | G02B 6/4476 |
| 2003/0063867 A1 | 4/2003 | McDonald et al. | |
| 2004/0008949 A1 | 1/2004 | Liu et al. | |
| 2005/0103515 A1 | 5/2005 | Fuller et al. | |
| 2005/0163448 A1 | 7/2005 | Blackwell, Jr. et al. | |
| 2005/0259928 A1 | 11/2005 | Elkins, II et al. | |
| 2006/0127026 A1 | 6/2006 | Beck | |
| 2006/0133758 A1 | 6/2006 | Mullaney et al. | |
| 2006/0147172 A1 | 7/2006 | Luther et al. | |
| 2006/0165366 A1 | 7/2006 | Feustel et al. | |
| 2006/0233507 A1 | 10/2006 | Makrides-Saravanos et al. | |
| 2006/0269208 A1 | 11/2006 | Allen et al. | |
| 2007/0003204 A1 | 1/2007 | Makrides-Saravanos et al. | |
| 2007/0147765 A1 | 6/2007 | Gniadek et al. | |
| 2007/0165995 A1 | 7/2007 | Reagan et al. | |
| 2008/0122681 A1 | 5/2008 | Battey et al. | |
| 2008/0138026 A1 | 6/2008 | Yow et al. | |
| 2008/0181570 A1 | 7/2008 | Mullaney | |
| 2008/0310796 A1 | 12/2008 | Lu | |
| 2009/0148101 A1 | 6/2009 | Lu et al. | |
| 2009/0148118 A1 | 6/2009 | Gronvall et al. | |
| 2009/0310929 A1 | 12/2009 | Reinhardt et al. | |
| 2010/0086260 A1 | 4/2010 | Parikh et al. | |
| 2010/0092136 A1 | 4/2010 | Nhep | |
| 2010/0195970 A1 | 8/2010 | Mudd et al. | |
| 2010/0303431 A1 | 12/2010 | Cox et al. | |
| 2010/0303433 A1 | 12/2010 | Gronvall et al. | |
| 2011/0075968 A1 | 3/2011 | Cao et al. | |
| 2011/0097050 A1 | 4/2011 | Blackwell, Jr. et al. | |
| 2011/0216751 A1 | 9/2011 | Bianchi et al. | |
| 2012/0014651 A1 | 1/2012 | Nad et al. | |
| 2013/0209049 A1 | 8/2013 | Kowalczyk et al. | |
| 2014/0064731 A1 | 3/2014 | Conner et al. | |
| 2014/0219621 A1 | 8/2014 | Barnette, Jr. et al. | |
| 2014/0241670 A1 | 8/2014 | Barnette, Jr. et al. | |
| 2015/0301300 A1 | 10/2015 | Fisher et al. | |
| 2016/0013864 A1 | 1/2016 | Rafel Porti et al. | |
| 2016/0124173 A1 | 5/2016 | Kowalczyk et al. | |
| 2016/0209615 A1 | 7/2016 | Bakatsias et al. | |
| 2017/0052332 A1 | 2/2017 | Smith et al. | |
| 2017/0153407 A1 | 6/2017 | Van Baelen et al. | |
| 2017/0184806 A1 | 6/2017 | Marius Goleret et al. | |
| 2018/0017751 A1 | 1/2018 | Wang et al. | |
| 2018/0364436 A1 | 12/2018 | Zimmel et al. | |
| 2020/0088968 A1 * | 3/2020 | Wang | G02B 6/46 |

FOREIGN PATENT DOCUMENTS

| | | |
|---|---|---|
| CN | 1656405 A | 8/2005 |
| CN | 1664637 A | 9/2005 |
| CN | 101688961 A | 3/2010 |
| CN | 102171598 A | 8/2011 |
| CN | 203133331 U | 8/2013 |
| CN | 104101953 A | 10/2014 |
| EP | 2 157 461 A1 | 2/2010 |
| EP | 2 330 707 A1 | 6/2011 |
| JP | H01-267508 A | 10/1989 |
| JP | 2001-201641 A | 7/2001 |
| WO | 2006/113726 A1 | 10/2006 |
| WO | 2008/109272 A1 | 9/2008 |
| WO | 2012/138856 A1 | 10/2012 |
| WO | 2014/123940 A1 | 8/2014 |

OTHER PUBLICATIONS

Extended European Search Report for European Patent Application No. 15861803.3 dated Jul. 16, 2018, 7 pages.

* cited by examiner

OPTICAL CABLE WIRING SYSTEM AND OPTICAL CABLE CONNECTING COMPONENT

CROSS-REFERENCE TO RELATED APPLICATION

This application is a Continuation of U.S. patent application Ser. No. 15/528,391, filed on 2 Oct. 2017, now U.S. Pat. No. 10,444,462, which is a National Stage Application of PCT/CN2015/095146, filed on 20 Nov. 2015, which claims the benefit of Serial No. 201410673296.3, filed on 21 Nov. 2014 in China and which applications are incorporated herein by reference. To the extent appropriate, a claim of priority is made to each of the above disclosed applications.

TECHNICAL FIELD

This invention relates to the field of optical fibre communications, and to be more specific, relates to a fibre to the home optical cable connecting assembly and a fibre to the home optical cable wiring system.

BACKGROUND OF THE INVENTION

FIG. 1 shows a fibre to the home optical cable wiring system of the prior art.

As shown in FIG. 1, in the prior art, fibre to the home optical cable wiring systems generally include a main optical cable 100', an optical cable junction box 200' and multiple single core distribution optical cables 101' and 102'. The multiple single core distribution optical cables 101' and 102' are connected optically to multiple optical fibres within the main optical cable 100' via an optical cable junction box 200'.

In the prior art depicted by FIG. 1, the main optical cable 100' and optical cable junction box 200' are generally disposed next to or near a user zone 10' (henceforth referred to as the "first user zone"). A first distribution optical cable 101' is optically connected respectively with each of the first user terminals 11' of the first user zone 10' via multiple single core distribution optical cables optically connected by the optical cable junction box 200' to the main optical cable 100'.

In the prior art shown in FIG. 1, due to the main optical cable 100' and optical cable junction box 200' being disposed next to or near the first user zone 10', the multiple single core distribution optical cables 101' are relatively short to facilitate installation.

But, when it is necessary to connect optical fibres to various second user terminals 21' in a second user zone 20' at a distance from the first user zone 10', the situation becomes more complex and problematic.

This is because it then becomes necessary to pull multiple single core second distribution optical cables 102' optically connected to an optical cable connector box 200' to each of the second user terminals 21' within a second user zone 20' at a distance from the first user zone 10'.

As shown in FIG. 1, due to there being a relatively great distance between the second user zone 20' and the first user zone 10', the multiple single core second distribution optical cables 102' need to be laid over relatively great distances, which results in a waste of optical cable, and additionally, the multiple loose single core second distribution optical cables 102' look disordered, causing a municipal eyesore. Apart from this, if accounts relating to the various second user terminals 21' within the second user zone 20' are opened at different times, it will be necessary to lay single core second distribution optical cables 102' over long distances on multiple occasions, resulting in increased labour costs.

SUMMARY OF THE INVENTION

The aim of this invention is to solve at least one aspect of the above mentioned problems and drawbacks of the prior art.

One aim of this invention is to provide a type of optical cable connecting assembly and a type of optical cable wiring system, capable of reducing the laying length of single core distribution optical cables connected to user terminals, thus reducing material and labour costs, in addition to improving municipal aesthetics.

One aspect of this invention is that it provides a type of optical cable wiring system, comprising: a main optical cable, first optical cable connector box and optical cable fan-out disposed near a first user zone; a second optical cable connector box located near the second user zone, said second user zone being at a distance from said first user zone, and a single main adapter optical cable disposed between the first optical cable connector box and second optical cable connector box, wherein said optical cable fan-out converts said single main adapter optical cable to a multiple branch adapter optical cables, said multiple branch adapter optical cables being optically connected to said main optical cable via said first optical cable connector box; multiple single core first distribution optical cables optically connected to the main optical cable via said first optical cable connector box and individually optically connected to each first user terminal of said first user zone; additionally, multiple single core second distribution optical cables optically connected to the main adapter optical cable via said second optical cable connector box, being individually optically connected to each second user terminal of said second user zone.

According to one exemplary embodiment of this invention, said optical cable fan-out includes a housing, said housing possessing a first terminal and a second terminal opposite the first terminal. Said first main adapter optical cable enters from the first terminal of said housing and is secured to the first terminal of said housing; additionally, said multiple branch adapter optical cables are drawn out of the second terminal of said housing and are secured to the second terminal of said housing.

According to another exemplary embodiment of this invention, said housing includes a base and a cover, said base and cover being constructed such that they lock together via a flexible catch structure.

According to another exemplary embodiment of this invention, a first end of said base forms a raised cylindrical section, said main adapter optical cable passing through said raised cylindrical section; additionally, said optical cable fan-out also includes heat shrink tubing, one end of said heat shrink tubing being heat shrunk onto said main adapter optical cable, the other end being heat shrunk onto said raised cylindrical section, thus hermetically securing the main adapter optical cable onto said raised cylindrical section.

According to another exemplary embodiment of this invention, there is a first catching slot formed on the internal wall of the second end of said base; said optical cable fan-out further including a retainer, which is for holding the multiple branch adapter optical cables together; said retainer catching in said first catching slot, thus securing the multiple branch adapter optical cables to said base of said housing.

According to another exemplary embodiment of this invention, said optical cable fan-out also includes a strain relief boot, said strain relief boot is fitted in a sleeved arrangement over said multiple branch adapter optical cables.

According to another exemplary embodiment of this invention, there is also a second catching slot formed on the internal wall of the second end of said base, there being a block shaped flange formed on said strain relief boot, said block shaped flange catching in said second catching slot, thus securing said strain relief boot to the base of said housing.

According to another aspect of this invention, it provides a type of optical cable connecting component, including: a single main adapter optical cable; an optical cable fan-out, for converting said main adapter optical cable to multiple branch adapter optical cables; a first optical cable connector box, for optically connecting the main optical cable to multiple branch adapter optical cables and multiple single core first distribution optical cables; and a second optical cable connector box, for optically connecting said main adapter optical cable to multiple single core second distribution optical cables.

According to an exemplary embodiment of this invention, said optical cable fan-out includes a housing, said housing possessing a first terminal and a second terminal opposite said first terminal; said main adapter optical cable is drawn in from the first terminal of said housing and secured to the first terminal of said housing; additionally, said multiple branch adapter optical cables are drawn out of the second terminal of said housing and are secured to the second terminal of said housing.

According to another exemplary embodiment of this invention, said housing includes a base and a cover, said base and cover being constructed so that they lock together via a flexible catch structure.

According to another exemplary embodiment of this invention, the first end of said base forms a raised cylindrical section, said main adapter optical cable passing through said raised cylindrical section; additionally, said optical cable fan-out also includes heat shrink tubing, one end of said heat shrink tubing being heat shrunk onto said main adapter optical cable, the other end being heat shrunk onto said raised cylindrical section, thus hermetically securing said main adapter optical cable to said raised cylindrical section.

According to another exemplary embodiment of this invention, there is a first catching slot formed on the internal wall of the second end of said base; said optical cable fan-out further including a retainer, for holding the multiple branch adapter optical cables together; additionally, said retainer catching in said first catching slot, thus securing the multiple branch adapter optical cables to the base of said housing.

According to another exemplary embodiment of this invention, said optical cable fan-out also includes a strain relief boot, said strain relief boot being fitted in a sleeved arrangement over said multiple branch adapter optical cables.

According to another exemplary embodiment of this invention, there is a second catching slot formed on the internal wall of the second end of said base; there being a block shaped flange formed on said strain relief boot, said block shaped flange catching in said second catching slot, thus securing the strain relief boot to the base of said housing.

According to another exemplary embodiment of this invention, said multiple single core first distribution optical cables are for separate optical connection to each of the first user terminals of a first user zone; said multiple single core second distribution optical cables are for separate optical connection to each of the second user terminals of a second user zone; additionally, said second user zone is at a distance from said first user zone.

In the optical cable connecting assembly and optical cable wiring system according to the various embodiments of this invention, the main optical cable disposed near the first user zone can be connected to a second optical cable connector box near the second user zone disposed at a distance from the first user zone via a first optical cable connector box disposed near the first user zone, an optical cable fan-out and a single main adapter optical cable. In this manner, it becomes unnecessary to lay multiple single core distribution optical cables over long distances between the first user zone and second user zone, thus reducing the laying length of single core distribution optical cable required for connecting to the second user zone at a distance from the main optical cable, reducing material and labour costs, and also improving municipal aesthetics.

The following descriptions of this invention in conjunction with the drawings should make the aims and advantages of this invention obvious and enable a full understanding of this invention.

SPECIFIC EMBODIMENTS

Figure 1:
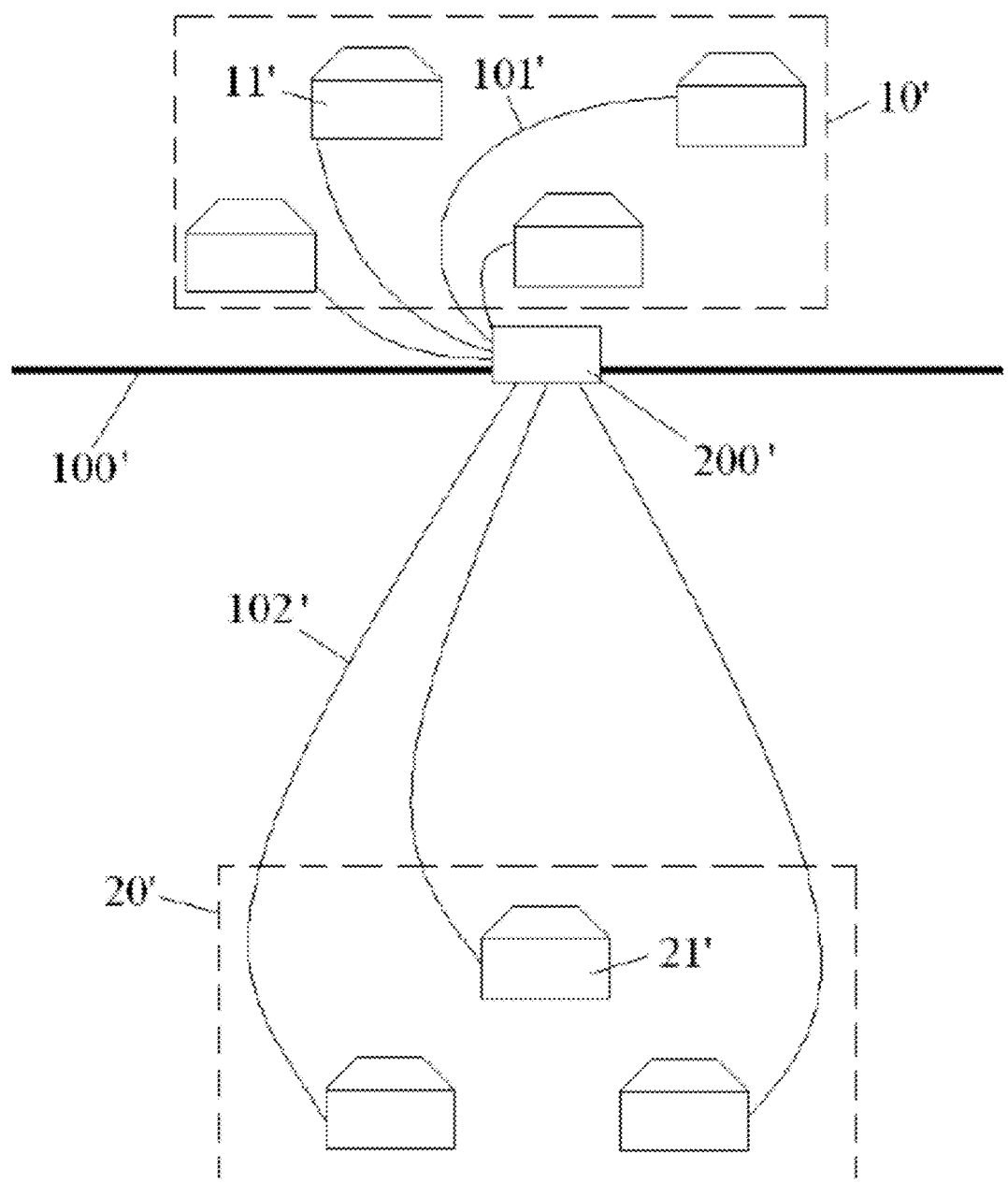
FIG. 1 shows a fibre to the home optical cable wiring system of the prior art.

The following embodiments, taken in conjunction with the drawings, provide a more detailed description of the technical schemes of this invention. Within the Description, numbering that is the same or similar in the drawings refers to components that are the same or similar. The aim of the following description of the modes of implementation of this invention taken in conjunction with the drawings is to explain the general inventive concept of this invention, and should not be understood as restricting this invention.

Apart from that, in the following detailed descriptions, for convenience of interpretation, many specific details are described in order to allow a full understanding of the disclosed embodiments. It should be clear that, one or more embodiments could be implemented without these specific details. In all other cases, structures and apparatuses which are common knowledge are represented graphically to simplify the drawings.

According to the general technical concept of this invention, it provides a type of optical cable wiring system, comprising: a main optical cable, first optical cable connector box and optical cable fan-out near the first user zone; a second optical cable connector box disposed near the second user zone, said second user zone being at a distance from said first user zone; and a single main adapter optical cable disposed between the first optical cable connector box and second optical cable connector box, wherein said optical cable fan-out converts said single main adapter optical cable to multiple branch adapter optical cables; said multiple branch adapter optical cables being optically connected to said main optical cable via said first optical cable connector box; multiple single core first distribution optical cables optically connected to said main optical cable via the first optical cable connector box, and individually optically connected to each first user terminal of the first user zone; additionally, multiple single core second distribution optical cables optically connected to the main adapter optical cable via said second optical cable connector box, being individually optically connected to each second user terminal of said second user zone.

Figure 2:
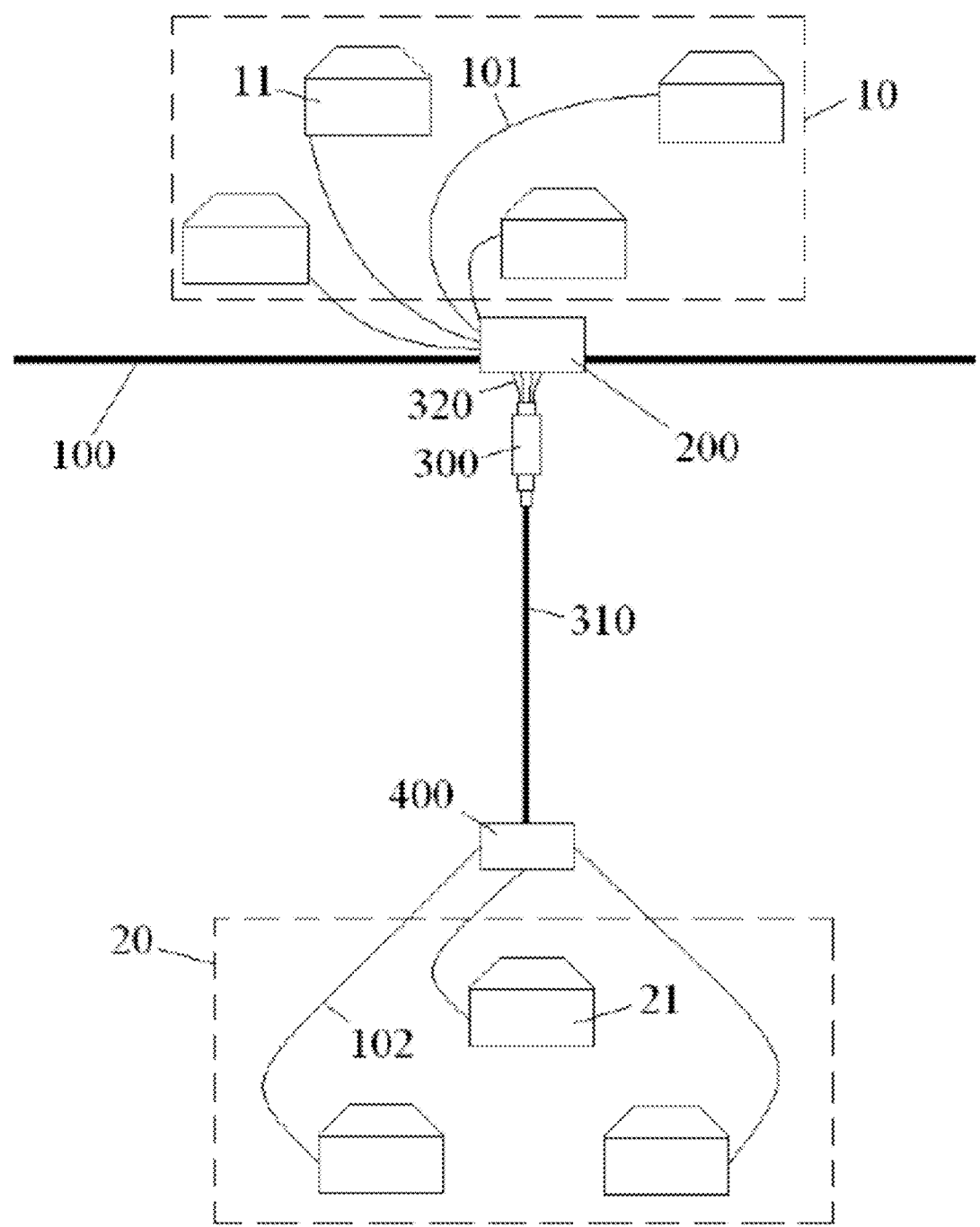
FIG. 2 shows a fibre to the home optical cable wiring system according to one exemplary embodiment of this invention.

FIG. 2 shows a fibre to the home optical cable wiring system according to one exemplary embodiment of this invention.

In the exemplary embodiment of this invention represented by FIG. 2, the optical cable wiring system mainly includes: a main optical cable 100, first optical cable connector box 200 and optical cable fan-out 300 disposed near the first user zone 10; a second optical cable connector box 400 disposed near the second user zone 20; and a single main adapter optical cable 310 disposed between the first optical cable connector box 200 and second optical cable connector box 400.

In the embodiment represented by the drawing, the second user zone 20 is at a distance from the first user zone 10. For instance, the first user zone 10 may be on one side of a wide road, and the second user zone 20 on the other side of the wide road. The distance between the first user zone 10 and second user zone 20 may be anywhere from a few metres to hundreds of metres.

Figure 3:
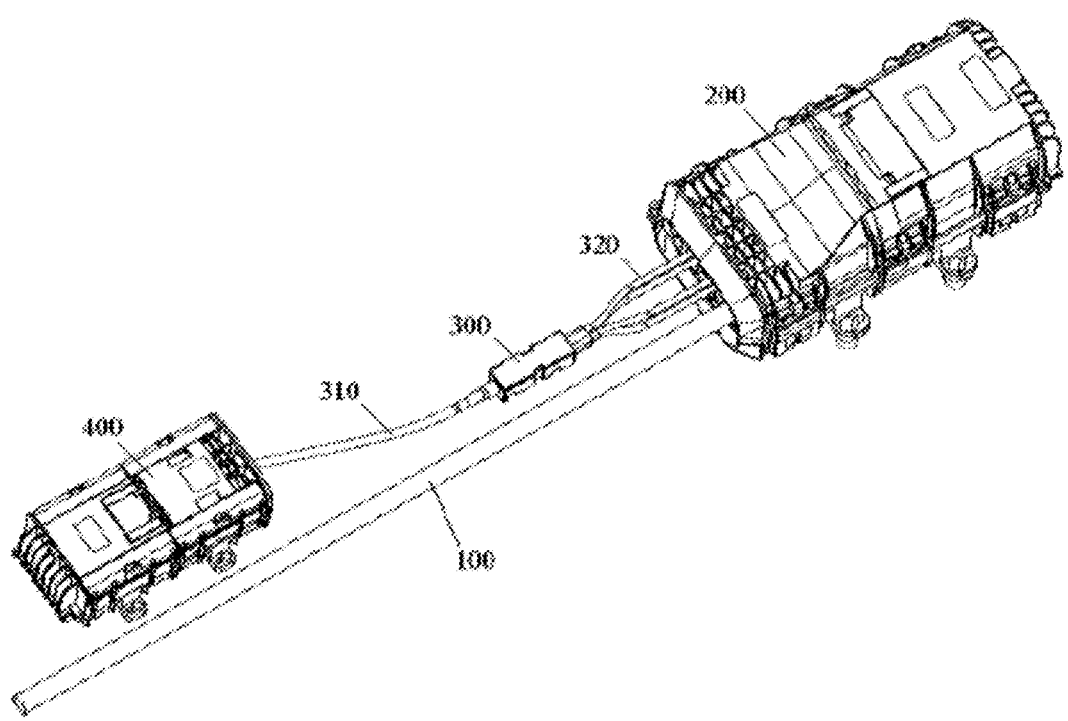
FIG. 3 is a 3 dimensional representation of the fibre to the home optical cable connecting assembly shown in FIG. 2.
Figure 4:
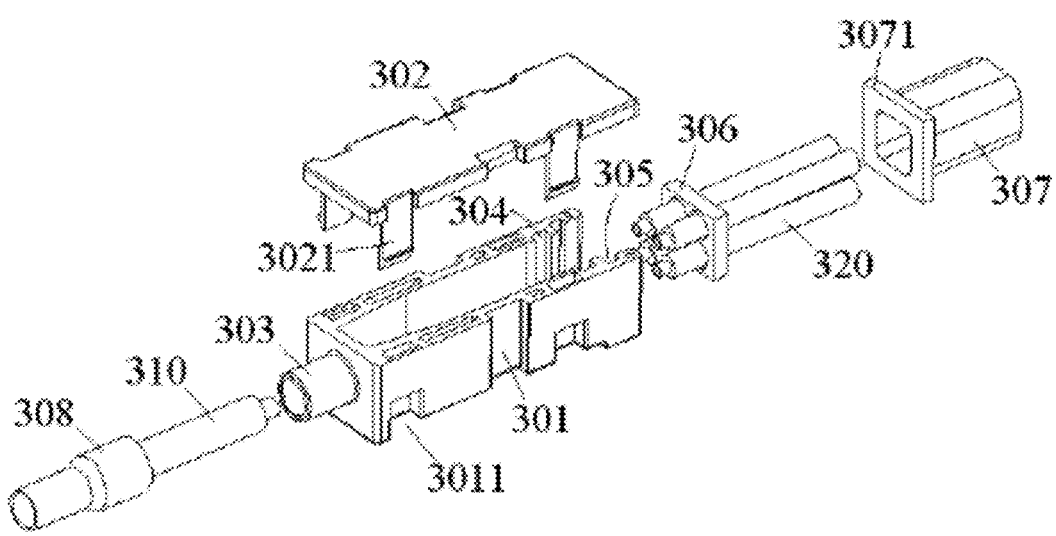
FIG. 4 is 3 dimensional exploded view of the optical cable fan-out shown in FIG. 3.

FIG. 3 is a 3 dimensional representation of the fibre to the home optical cable connecting assembly shown in FIG. 2; and FIG. 4 is a 3 dimensional exploded view of the optical cable fan-out 300 in FIG. 3.

In the exemplary embodiment of this invention graphically represented in FIG. 2, FIG. 3 and FIG. 4, the optical cable fan-out 300 converts a single main adapter optical cable 310 to multiple branch adapter optical cables 320.

In one exemplary embodiment of this invention, the single main adapter optical cable 310 may be an 8/12 core ADSS optical cable, and the branch adapter optical cable 320 may be a single core ADSS optical cable.

Please continue to refer to FIG. 2, FIG. 3 and FIG. 4. In the embodiment depicted, multiple branch adapter optical cables 320 are optically connected to the main optical cable 100 via a first optical cable connector box 200.

In one exemplary embodiment of this invention, the multiple branch adapter optical cables 320 may be optically connected (otherwise known as optically spliced) via optical fusion or an optical connector to the multiple corresponding optical fibres of the main optical cable 100 in the first optical cable connector box 200.

Please continue to refer to FIG. 2, FIG. 3 and FIG. 4. In the embodiment depicted, the multiple single core first distribution optical cables 101 are optically connected to the main optical cable 100 via the first optical cable connector box 200, and are individually connected to each first user terminal 11 of the first user zone 10.

In one exemplary embodiment of this invention, the multiple single core first distribution optical cables 101 may be optically connected (otherwise known as optically spliced) via optical fusion or an optical connector to the multiple corresponding optical fibres of the main optical cable 100 in the first optical cable connector box 200.

Please continue to refer to FIG. 2, FIG. 3 and FIG. 4. In the embodiment depicted, multiple single core second distribution optical cables 102 are optically connected to the single main adapter optical cable 310 via the second optical cable connector box 400, then are individually optically connected to each second user terminal 21 of the second user zone 20.

In an exemplary embodiment of this invention, the multiple single core second distribution optical cables 102 may be optically connected (otherwise known as optically spliced) via optical fusion or an optical connector to the multiple corresponding optical fibres of the single main adapter optical cable 310 in the second optical cable connector box 400.

In this manner, as shown in FIG. 2, it becomes unnecessary to lay multiple single core second distribution optical cables 102 over long distances between the first user zone 10 and second user zone 20, thus reducing the laying length of single core second distribution optical cables 102 required for connecting to the second user zone 20 located at a distance from the main optical cable 100, reducing material and labour costs, and additionally improving municipal aesthetics.

The following provides a detailed description of the particular structures of the optical cable connecting assembly and optical cable fan-out 300 in FIG. 2 with reference to FIG. 3 and FIG. 4.

As shown in FIG. 3, in one embodiment of this invention, the optical cable connecting assembly mainly includes: a single main adapter optical cable 310; an optical cable fan-out 300 for converting the single main adapter optical cable 310 to multiple branch adapter optical cables 320; a first optical cable connector box 200, for optically connecting the main optical cable 100 to multiple branch adapter optical cables 320 and multiple single core first distribution optical cables 101; a second optical cable connector box 400, being for the purpose of connecting the single main adapter optical cable 310 to multiple single core second distribution optical cables 102.

As shown in FIG. 4, in one exemplary embodiment of this invention, the optical cable fan-out 300 includes a housing 301 and 302, that housing 301 and 302 having a first terminal (the right hand terminal in FIG. 4) and a second terminal opposite the first terminal (the left hand terminal in FIG. 4). A single main adapter optical cable 310 is drawn in from the first terminal of the housing 301 and 302 and secured to the first terminal of the housing 301 and 302; additionally, multiple branch adapter optical cables 320 are secured to the second terminal of the housing 301 and 302 and are drawn out from the second terminal of the housing 301 and 302.

Please continue to refer to FIG. 4. In the embodiment depicted in the drawing, the housing 301 and 302 includes a base 301 and a cover 302. In one exemplary embodiment of this invention, the base 301 and cover 302 are constructed so that they lock together via a flexible catch structure 3011 and 3021. The flexible catch structure 3011 and 3021 includes a flexible catch 3021 formed on the cover 302 and a recessed slot 3011 formed on the base 301. When the cover 302 is installed on the base 301, the flexible catch 3021 clips into the recessed slot 3011, thus locking the base 301 and the cover 302 together.

In one exemplary embodiment of this invention, as shown in FIG. 4, one end of the base 301 is formed into a raised cylindrical section 303, a single main adapter optical cable 310 passing through the raised cylindrical section 303; additionally, the optical cable fan-out 300 also includes heat shrink tubing 308, one end of the heat shrink tubing 308 being heat shrunk onto the single main adapter optical cable 310, the other end being heat shrunk onto the raised cylindrical section 303, thus hermetically securing the single main adapter optical cable 310 onto the raised cylindrical section 303.

In one exemplary embodiment of this invention, as shown in FIG. 4, there is a first catching slot 304 formed on the internal wall of the second end of the base 301; the optical cable fan-out 300 further including a retainer 306, which is for holding the multiple branch adapter optical cables 320 together; additionally, the retainer 306 being suitable for catching in the first catching slot 304, thus being capable of securing the multiple branch adapter optical cables 320 to the base 301 of the housing.

As shown in FIG. 4, in one exemplary embodiment of this invention, the optical cable fan-out 300 also includes a strain relief boot 307, the strain relief boot 307 fitting in a sleeved arrangement over the multiple branch adapter optical cables 320 in order to prevent the multiple branch adapter optical cables 320 from being damaged due to the effects of lateral strain.

In one exemplary embodiment of this invention, as shown in FIG. 4, there is a second catching slot 305 formed on the internal wall of the second end of the base 301; there being a block shaped flange 3071 formed on the strain relief boot 307, the block shaped flange 3071 catching in the second catching slot 305, thus securing the strain relief boot 307 to the base 301 of the housing.

Persons skilled in the art can understand that the embodiments described above are just examples. Moreover, persons skilled in the art could carry out improvements to these embodiments and freely combine the structures described in the various embodiments without structural or theoretical conflict.

Although this invention has been described in conjunction with the drawings, the aim of the embodiments disclosed in the drawings is purely to provide illustrative descriptions of preferred implementations of this invention, and should not be understood as constituting any kind of restriction on this invention.

Although some embodiments of the general inventive concept have been depicted and described, a person with ordinary skill in the art could modify these embodiments without departing from the principles and spirit of the overall inventive concept. The scope of this invention is defined by the claims and their equivalents.

It should be understood that the word "including" does not exclude other elements or steps, and the word "an" or "one" does not exclude more than one. Apart from this, the labelling of any element in the claims should not be understood as restricting the scope of this invention.

The invention claimed is:

1. An optical cable wiring system, comprising:
an optical cable connector box;
a main optical cable extending directly from the optical cable connector box;
an optical cable fan-out;
a single main adapter optical cable extending directly from the optical cable fan-out; and
a plurality of branch optical cables extending directly from the optical cable connector box to the optical cable fan-out such that optical signals carried by the main optical cable can pass to the branch optical cables and from the branch optical cables to the single main adapter cable via the optical cable fan-out.

2. The optical cable wiring system of claim 1, further comprising:
multiple single core first distribution optical cables extending directly from the optical cable connector box and optically connected to the main optical cable via said optical cable connector box and individually optically connectable to each of a plurality of first user terminals.

3. The optical cable wiring system of claim 2, wherein the optical cable connector box is a first optical cable connector box, and further comprising:
a second optical cable connector box, the single main adapter cable extending directly from the optical fan-out to the second optical cable connector box; and
multiple single core second distribution optical cables optically connected to the single main adapter optical cable via the second optical cable connector box, the multiple single core second distribution optical cables being individually optically connectable to each of a plurality of second user terminals.

4. The optical cable wiring system of claim 1, wherein the optical cable fan-out includes a housing having a first terminal and a second terminal opposite the first terminal, the single main adapter optical cable being drawn in from the first terminal of the housing and secured to the first terminal of the housing.

5. The optical cable wiring system of claim 4, wherein the housing includes a base and a cover, the base and the cover being adapted to lock together by a flexible catch structure.

6. The optical cable wiring system of claim 5,
wherein the optical cable fan-out includes a retainer for holding the multiple branch adapter optical cables together, the retainer being adapted to secure the multiple branch adapter optical cables to the base of the housing.

7. The optical cable wiring system of claim 6,
wherein the optical cable fan-out includes a strain relief boot positioned over the multiple branch adapter optical cables.

8. The optical cable wiring system of claim 7, wherein the strain relief boot includes a block shaped flange adapted to secure the strain relief boot to the base of the housing.

9. The optical cable wiring system of claim 1, wherein the plurality of branch optical cables and the main optical cable enter the optical cable connector box at the same side of the optical cable connector box.

10. The optical cable wiring system of claim 9, wherein the single main adapter cable and the plurality of branch optical cables enter the optical cable fan-out at opposite sides, respectively, of the optical cable fan-out.

11. The optical cable wiring system of claim 1, wherein the single main adapter cable and the plurality of branch optical cables enter the optical cable fan-out at opposite sides, respectively, of the optical cable fan-out.

12. The optical cable wiring system of claim 1, wherein the single main adapter cable is longitudinally longer than each of the plurality of branch optical cables.

13. The optical cable wiring system of claim 12, wherein the main optical cable is longitudinally longer than the main adapter cable.

14. The optical cable wiring system of claim 3, wherein the second optical cable connector box is smaller than the first optical cable connector box.

15. An optical cable wiring system, comprising:
an optical cable connector box;
a main optical cable extending from the optical cable connector box;

an optical cable fan-out;
a single main adapter optical cable extending from the optical cable fan-out;
a plurality of branch optical cables extending from the optical cable connector box to the optical cable fan-out such that optical signals carried by the main optical cable can pass to the branch optical cables and from the branch optical cables to the single main adapter cable via the optical cable fan-out; and
multiple single core first distribution optical cables extending from the first optical cable connector box and optically connected to the main optical cable via said optical cable connector box and individually optically connectable to each of a plurality of first user terminals.

16. The optical cable wiring system of claim 15, wherein the optical cable connector box is a first optical cable connector box, and further comprising:
a second optical cable connector box, the single main adapter cable extending from the optical fan-out to the second optical cable connector box; and
multiple single core second distribution optical cables optically connected to the single main adapter optical cable via the second optical cable connector box, the multiple single core second distribution optical cables being individually optically connectable to each of a plurality of second user terminals.

* * * * *